US009227572B2

(12) United States Patent
Lesk et al.

(10) Patent No.: US 9,227,572 B2
(45) Date of Patent: Jan. 5, 2016

(54) CONTAINER

(71) Applicants: Sharon Lesk, London (GB); Katherine Keck, Los Angeles, CA (US)

(72) Inventors: Sharon Lesk, London (GB); Katherine Keck, Los Angeles, CA (US)

(73) Assignee: Sharon Lesk, Los Angeles, CA (US)

( * ) Notice: Subject to any disclaimer, the term of this patent is extended or adjusted under 35 U.S.C. 154(b) by 0 days.

(21) Appl. No.: 14/695,129

(22) Filed: Apr. 24, 2015

(65) Prior Publication Data

US 2015/0232037 A1    Aug. 20, 2015

Related U.S. Application Data

(63) Continuation of application No. 10/725,857, filed on Dec. 1, 2003, now abandoned.

(60) Provisional application No. 60/449,300, filed on Feb. 20, 2003, provisional application No. 60/430,600, filed on Dec. 2, 2002.

(51) Int. Cl.
   *B65D 85/52*    (2006.01)
   *B60R 7/08*    (2006.01)
   *B65D 25/10*   (2006.01)

(52) U.S. Cl.
   CPC ............. *B60R 7/085* (2013.01); *B65D 25/108* (2013.01); *B65D 85/52* (2013.01)

(58) Field of Classification Search
   CPC ........... B65D 85/52; A01G 9/02; A47G 7/06; A47G 23/02; A47G 23/0208; A47G 23/0216; A47G 23/0225; A47G 23/0233
   USPC ........... 206/423; 47/41.3, 71–84; 224/4, 275, 224/483–487, 539–544; 248/311.2; 296/24, 296/34, 37.1; 297/188.01
   See application file for complete search history.

(56) References Cited

U.S. PATENT DOCUMENTS

| | | |
|---|---|---|
| 627,231 A | 6/1899 | Hinrichs |
| 1,633,184 A | 6/1927 | Luipersbek |
| 2,057,856 A | 10/1936 | Stone |
| 2,637,143 A | 5/1953 | Reydonlds et al. |
| 2,881,562 A | 4/1959 | Ragot |
| 2,963,256 A | 12/1960 | Borah |
| 3,477,175 A | 11/1969 | Sakamoto |
| 3,973,316 A | 8/1976 | Maher |
| 4,901,961 A | 2/1990 | Gish |
| 5,477,640 A | 12/1995 | Holtkamp, Jr. |
| 5,947,322 A | 9/1999 | Ho |
| 6,006,472 A | 12/1999 | Holtkamp, Jr. |
| 6,457,276 B1 | 10/2002 | Masters |
| 6,516,563 B1 | 2/2003 | Matthwes |
| 6,832,745 B2 | 12/2004 | Lindsay |
| 2004/0099557 A1 | 5/2004 | Lesk et al. |
| 2005/0051689 A1 | 3/2005 | Gory |

OTHER PUBLICATIONS

Patent Trial an Appeals Board Decision dated Mar. 13, 2015, Appeal No. 2012-005479, U.S. Appl. No. 10/725,857, filed Dec. 1, 2003.

*Primary Examiner* — Bryon Gehman
(74) *Attorney, Agent, or Firm* — Feldman Gale, P.A.; Gregory B. Wood

(57) ABSTRACT

A container for flowers and other plant parts as well as other items, and adapted for use in, inter alia, motor vehicles. The container can further include a ring such as a detachable grooved ring for holding aromatic substances and to prevent water from splashing out of the container.

16 Claims, 3 Drawing Sheets

CONTAINER

CROSS-REFERENCE TO RELATED APPLICATIONS

This application is a continuation of Ser. No. 10/725,857, filed on Dec. 1, 2003, which claims the benefit under 35 U.S.C. §119(e) of Provisional Application Nos. 60/430,600, filed on Dec. 2, 2002 and No. 60/449,300 filed on Feb. 20, 2003. The content of each of the above-identified applications is hereby incorporated herein by reference in its entirety.

FIELD OF INVENTION

This invention relates generally to containers for flowers and other items, and in particular to containers suitable for displaying flowers and other plant parts in motor vehicles.

BACKGROUND

Generally, containers for displaying flowers include a receptacle and means for supporting flower stems. Various means for supporting flower stems are well known in the art. For example, U.S. Pat. No. 2,333,561 to Hamblin describes a set of spines for impaling flower stems, U.S. Pat. No. 3,245,175 to Klingberg describes a disc with cross-shaped holes for gripping flower stems, U.S. Pat. No. 5,927,002 to Walton et al. describes a foam cylinder with holes for receiving flower stems, and U.S. Pat. No. 6,189,261 to Helgeson describes a grid with openings for receiving flower stems. These patents are incorporated by reference herein.

Flower containers for displaying flowers in motor vehicles typically require a hanger or bracket to hold and support the flower container in the vehicle. Such support devices are often esthetically unappealing, appearing out-of-place in the fully integrated interior design of modern automobiles. Moreover, many support devices are attached by tape or screws which damage the interior surfaces of the motor vehicle. What is needed is anesthetically pleasing way of displaying flowers and other plant parts without harming the motor vehicle interior.

SUMMARY

The present invention is directed to a container for flowers, other decorative plant parts such as branches, and other items, for use in motor vehicles. The container includes a receptacle having a closed bottom, an open top, and sides that connect the bottom and top, and means to support flower stems or other plant stems that are inserted into the receptacle. Rather than being supported by an added bracket or hanger, the container is designed to fit into motor vehicle receptacle containers such as built-in drink holders typically present in motor vehicles and commercially available portable drink holders typically used in motor vehicles. Filled with real or artificial flowers, the container adds a decorative element to the automobile without harming the interior.

DETAILED DESCRIPTION

Figure 1:
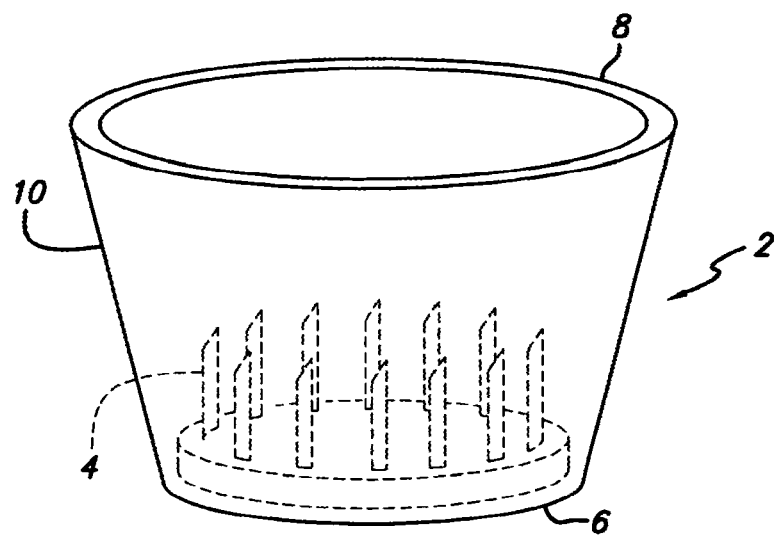
FIG. 1 is a perspective view of a container in accordance with the present invention.

Referring to FIG. 1 showing an embodiment of the present invention, a container comprises a receptacle 2 and a set of spaced prongs 4 for supporting flower stems inserted into the receptacle. The receptacle has a generally circular bottom 6, a generally circular top 8 with an opening of greater diameter than the bottom, and sides 10 that slope inwardly from the top to the bottom.

The generally cup-shaped receptacle can be made of any suitable material such as metal, plastic, stone, glass, porcelain, and ceramic. The receptacle can be weighted at the bottom for added stability. Also, a bead of material can be placed around the outer surface of the top.

The dimensions of the receptacle can vary in accordance with the size and shape of the drink holder as long as the receptacle fits into the drink holder without tipping over. Preferably, the diameter of the bottom is about 2.25 inches to 4 inches, the diameter of the top is about 2.25 inches to 4 inches, and the vertical height of the receptacle from bottom to top is about 1.5 inches to 5 inches. In a particular embodiment of the container, the bottom is about 2.5 inches in diameter, the top is about 3.375 inches (3+⅜ inches) in diameter, and the vertical height of the receptacle from top to bottom is about 2.75 inches.

In other embodiments, the receptacle sides can end at the top with inwardly directed lips or inwardly projecting edges, forming a ledge around the top opening of the receptacle. The ledge can be useful for preventing water in the container from splashing out.

Figure 2:
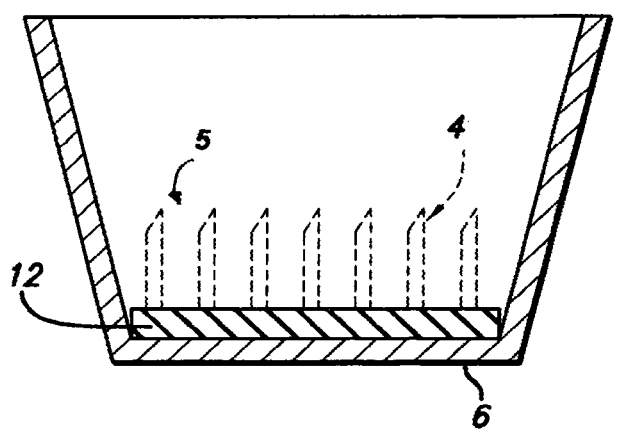
FIG. 2 is a cross-sectional view showing a set of prongs inside a container.

Referring to FIG. 2, the set of spaced prongs 4 projects perpendicularly from the bottom 6 of the receptacle. The prongs can be arranged in any pattern although a generally circular pattern is preferred. Depending on the construction material, the prongs can be of any size, thickness and spacing sufficient to support flower stems without breaking the prongs. In one version of the container, each prong is about ⅝ inches in length, with a cross-sectional diameter of about ⅛ inches. In FIG. 2, the prongs 4 are attached to a support 12 to form a prong assembly 5 called a "frog" in the art, and the frog can be permanently or removably connected to the receptacle bottom 6. Alternatively, the prongs can be directly mounted to the bottom of the receptacle.

Other means for supporting the stems of flowers are well known in the art and can substitute for the prongs and frog. The supporting means can be located in or on top of the receptacle depending on the type of supporting device. For example, a disc with holes for gripping flower stems, as described in the patent to Hamblin, and a foam cylinder with holes for receiving flower stems, as described in the patent to Klingberg, can be inserted into the receptacle, while a grid with openings for receiving flowers, as described in the patent to Klingberg, can be positioned on the top of the receptacle.

Figure 3:
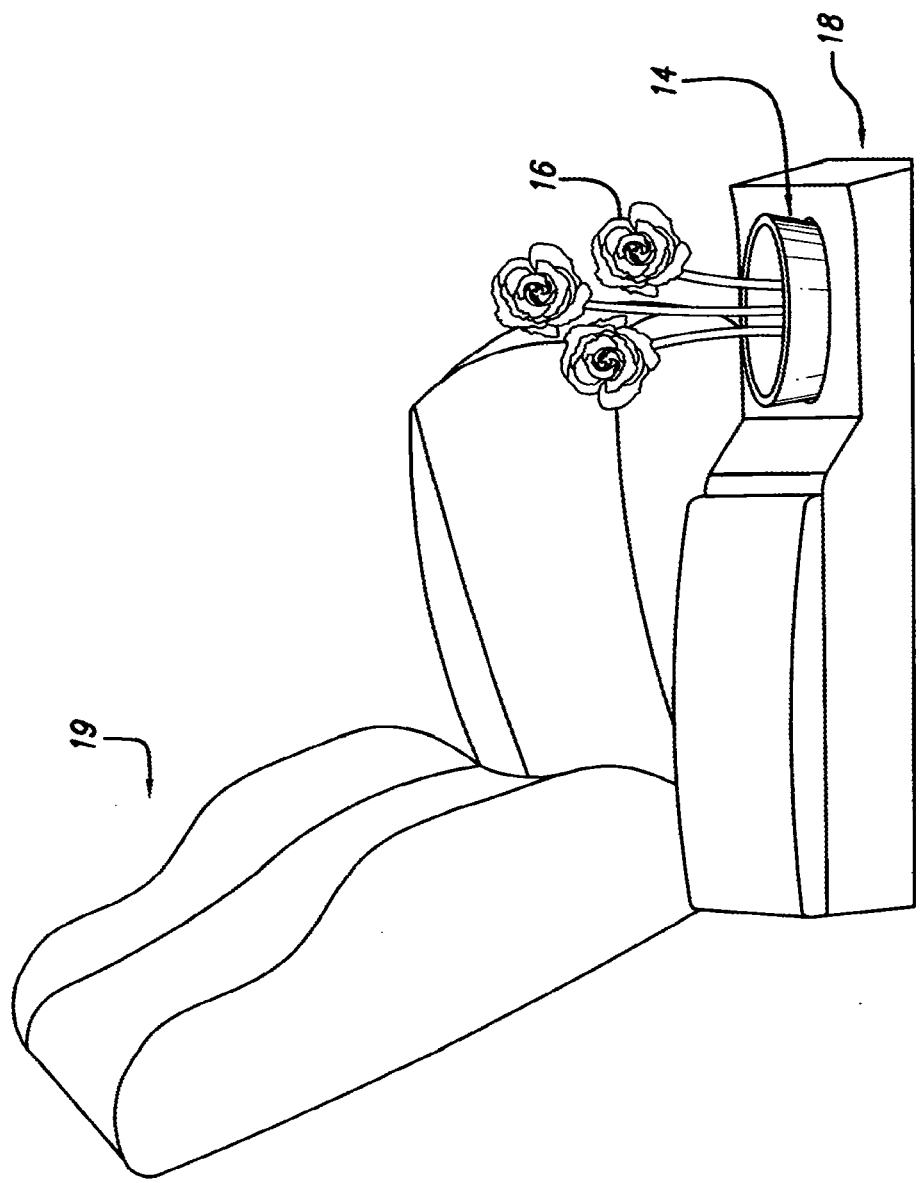
FIG. 3 shows a container placed in a motor vehicle drink holder.

In practice, the stems of real or artificial flowers are impaled or otherwise supported by the prongs, and the container is placed into a motor vehicle drink holder. As an example, FIG. 3 shows a container 14, with flowers 16, placed into an automobile drink holder 18 located next to a car seat 19. With real flowers, water can be added to the container to maintain freshness. The container can also hold chocolate or hard candy bouquets, or hold plants or plant parts other than flowers. In addition, the container can be used without flowers or water to hold other suitably sized articles such as candy, coins, ticket stubs, pencils, keys, or the like.

Air freshener or deodorizer can be added to the container to maintain air freshness in the motor vehicle. As an example, a strip of car air freshener or deodorizer can be attached to the receptacle, preferably on the inside surface near the top. The air freshener or deodorizer can be used with or without flowers.

Although a receptacle having inwardly sloping sides is shown, it will be apparent to those skilled in the art that other receptacles can have different shapes, such as cylindrical, irregular, or with sides sloping outwardly, as long as the receptacle can fit into a drink holder without tipping over. Also, while a receptacle having a generally circular bottom and top is shown, the bottoms and tops of other receptacles can be different shapes such as oval or polygonal that are capable of fitting into the opening of a motor vehicle drink holder.

Figure 4:
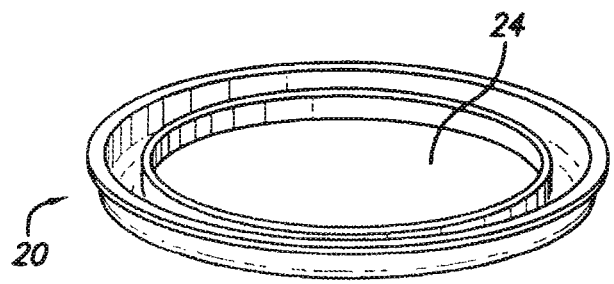
FIG. 4 is a perspective view of a detachable grooved ring in accordance with the present invention.
Figure 5:
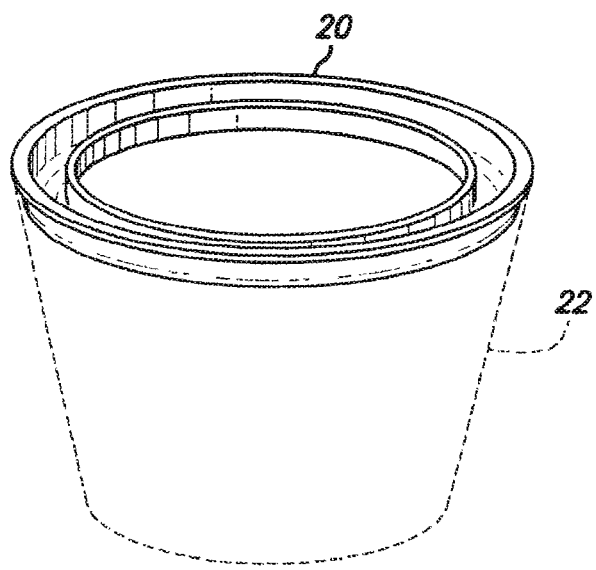
FIG. 5 is a perspective view showing a container with a detachable grooved ring.

Referring to FIGS. 4 and 5, a ring such as a grooved ring 20 can be permanently or detachably inserted into the flower container 22. The grooved ring can be used to hold a substance, such as aromatic wax, and to prevent water from splashing out of the receptacle. The dimensions of the grooved ring can vary in accordance with the size and shape of the receptacle. Although the ring can be inserted at an angle relative to the bottom and top, it is preferably oriented such that the plane of the ring is generally parallel to the bottom and top. Also, while the ring can be located at any desired depth inside the receptacle, the preferred location is at the top, as shown in FIG. 5.

Referring to FIG. 4, the size of the ring opening 24 can vary as long as an opening sufficient to hold real flowers, artificial flowers, chocolate bouquets, hard candy bouquets, plant or plant parts other than flowers, or the like, is provided. The opening is preferably located in the center of the ring. However, the opening can be located off-center.

Figure 6:
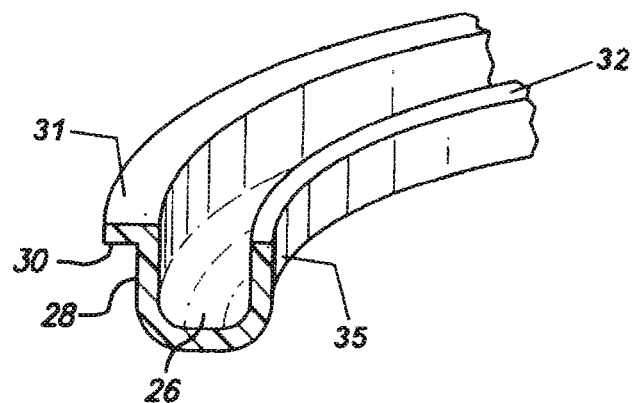
FIG. 6 is a perspective view showing a cross-section of a detachable grooved ring.

As shown in the cross-sectional view of FIG. 6, a concentric groove 26 extends around the ring to form a single continuous channel. As will be apparent, other groove arrangements are available, such as a discontinuous groove having two or more channel elements, and a groove that extends only partially around the ring. A groove that extends fully around the ring is preferred. The groove can be any shape and dimension suitable for holding a desired substance, such as aromatic wax or a dab of perfume, cologne or air freshener. Possible shapes include U-shaped, V-shaped and the like. When the ring holds an aromatic substance, the groove is preferably oriented in an upwardly direction to expose the substance to the environment.

In particular embodiments, the ring is designed to press-fit into the receptacle, with the contacting surface of the ring matching the converging sides of the receptacle 22. In other embodiments, as shown in FIG. 6, the outer wall 28 of the ring has a lip 30 with a top edge 31 for fitting over the top rim 8 (FIG. 1) of the receptacle 22 for keeping the ring 20 in place, and an inner wall 35 with a top edge 32. As shown in FIG. 6, the top edge 32 is at a height with respect to the bottom 6 that is less than a height of the top edge 31 with respect to the bottom 6.

Although an annular ring is shown, the ring can be any shape that fits into the receptacle. Preferably, the shape of the ring matches the shape of the bottom and top. For example, the embodiment shown in FIGS. 4, 5, and 6 illustrates the outer wall of the grooved ring 20 as having a lip to rest on the top of the receptacle 22, where a top edge of the outer wall 28 is illustrated as higher than the inner wall of the grooved ring. In another embodiment the grooved ring 20 can be located entirely inside the receptacle.

As with the receptacle, the ring can be made of any suitable material such as metal, plastic, stone, glass, porcelain, and ceramic.

The container of the present invention can be permanently inserted into the drink holder, but is preferably removable. A removable container is not limited to displaying flowers in a motor vehicle, and can be taken out of the motor vehicle drink holder to transport flowers to the home, office or other location. A single container thus provides a convenient way to decorate motor vehicles and other locations.

What is claimed is:

1. A container adapted to be received in a motor vehicle drink holder, comprising:
   a) a receptacle having:
      i) a closed bottom,
      ii) a top with an opening, and
      iii) a sidewall that connects the bottom and the top; and
   b) a grooved ring defining a circumferential channel, the grooved ring sized to be press-fitted into the opening of the receptacle top, the grooved ring having an outer wall with an outer wall top edge, and an inner wall, with an inner wall top edge, the outer wall being positioned adjacent to the receptacle sidewall, the inner wall top edge being below the outer wall top edge.

2. The container of claim 1, wherein the grooved ring is configured to retain an item stored in the receptacle.

3. The container of claim 1, wherein a fluid is stored in the receptacle, and wherein the grooved ring is positioned at the top of the receptacle for keeping the fluid from splashing out of the receptacle.

4. The container of claim 3, further comprising a prong assembly, wherein the prong assembly is permanently connected to the closed bottom.

5. The container of claim 3, further comprising a prong assembly, wherein the prong assembly is removably connected to the closed bottom.

6. The container of claim 1, wherein the receptacle further comprises a prong assembly separate from and contacting the closed bottom for supporting a plant stem inserted into the receptacle.

7. The container of claim 6, wherein the prong assembly is removably connected to the closed bottom.

8. The container of claim 1, wherein the grooved ring is detachable.

9. The container of claim 1, wherein the grooved ring extends completely around the receptacle.

10. The container of claim 1, wherein the grooved ring is configured to contain an air freshener or a deodorizer in the channel.

11. A container adapted to be received in a motor vehicle drink holder, comprising:
   a) a cup-shaped receptacle comprising:
      i) a closed bottom,
      ii) a top with an opening, and
      iii) a sidewall that connects the top and the bottom;
   b) a detachable grooved ring defining a circumferential channel, the grooved ring positioned in the cup-shaped receptacle, the detachable grooved ring sized to be press-fitted into the opening of the top, and having an outer wall with an outer wall top edge, and an inner wall, with an inner wall top edge, the outer wall being positioned adjacent to the sidewall of the receptacle, the inner wall top edge being below the outer wall top edge; and c) a prong assembly contacting the closed bottom, for supporting a plant stem.

12. The container of claim 11 wherein the closed bottom and the top are generally circular.

13. The container of claim 11, wherein the prong assembly is permanently connected to the closed bottom.

14. The container of claim 11, wherein the prong assembly is removably connected to the closed bottom.

15. A container adapted to be received in a motor vehicle drink holder, comprising:
 a receptacle comprising:
  a closed bottom,
  a top with an opening, and
  a sidewall that connects the bottom and the top; and
  a grooved ring defining a circumferential channel, said ring sized to be press-fitted into the opening of the top and having an outer wall and an inner wall, the channel configured to hold liquid, the outer wall having an outer wall top edge, and the inner wall having an inner wall top edge, the outer wall being positioned adjacent to the sidewall of the receptacle, the inner wall top edge being below the outer wall top edge.

16. A container adapted to be received in a motor vehicle drink holder, comprising:
 a receptacle comprising:
  a closed bottom,
  a top with an opening, and
  a sidewall that connects the bottom and the top; and
 a ring sized to be press-fitted into the opening of the top, the ring having a groove between an outer wall and an inner wall, the outer wall being adjacent to the sidewall of the receptacle, the inner wall having a top edge, the top edge of the inner wall being positioned below the top of the sidewall of the receptacle.

* * * * *